L. G. TAYLOR.
COMBINATION SEAT AND BED FOR AUTOMOBILES.
APPLICATION FILED NOV. 10, 1920.
1,390,177.
Patented Sept. 6, 1921.
2 SHEETS—SHEET 1.
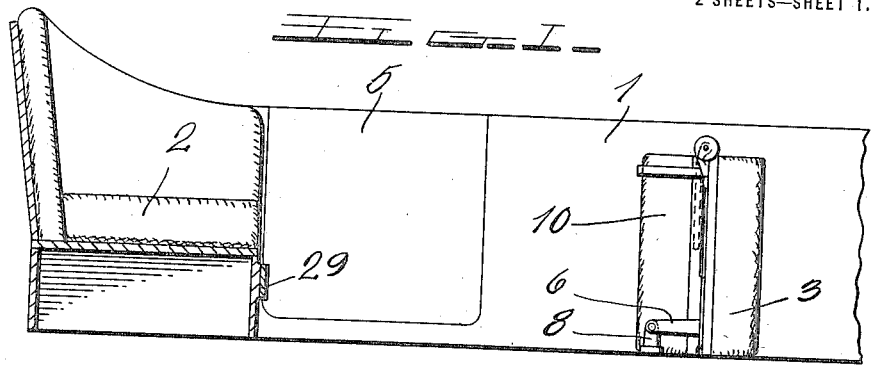
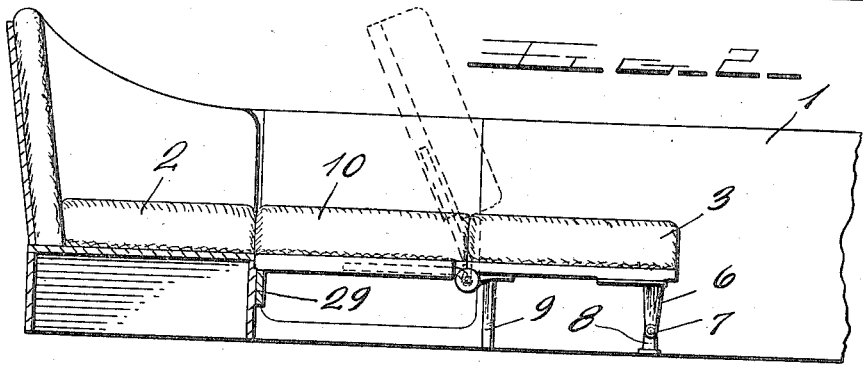
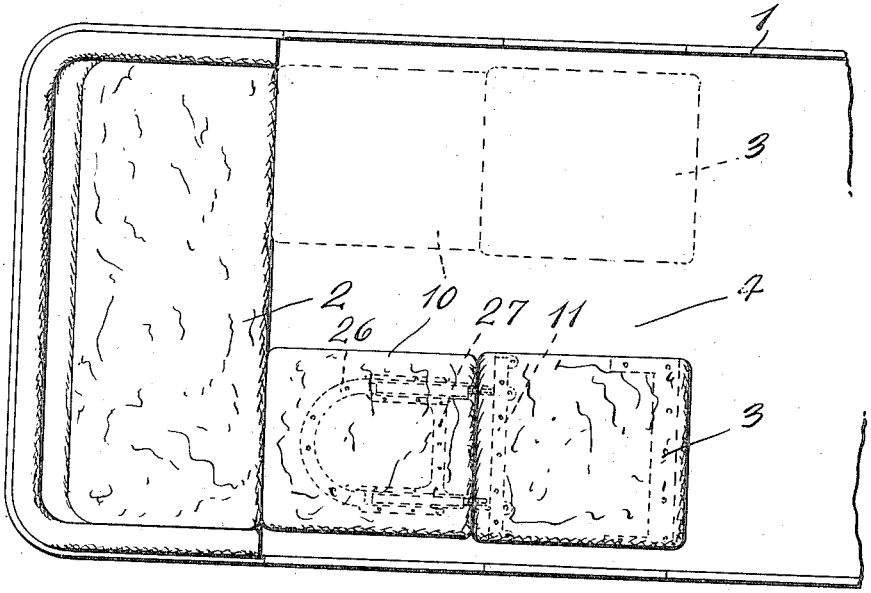
Inventor
Levin G. Taylor
By Wilkinson & Giusta
Attorneys

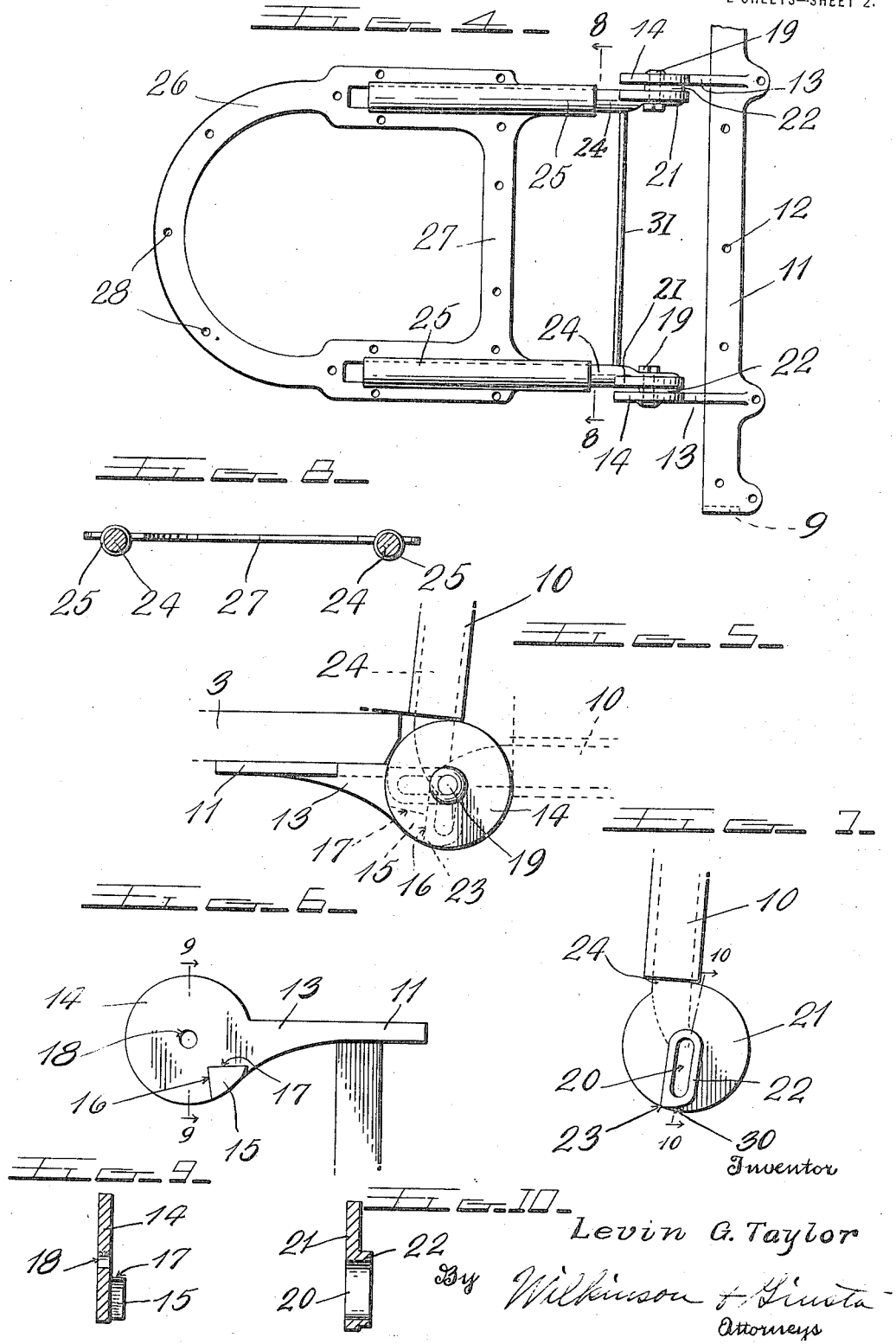

UNITED STATES PATENT OFFICE.

LEVIN GRUBB TAYLOR, OF TAMPA, FLORIDA.

COMBINATION SEAT AND BED FOR AUTOMOBILES.

1,390,177.  Specification of Letters Patent.  Patented Sept. 6, 1921.

Application filed November 10, 1920. Serial No. 423,107.

*To all whom it may concern:*

Be it known that I, LEVIN G. TAYLOR, a citizen of the United States, residing at Tampa, in the county of Hillsborough and State of Florida, have invented certain new and useful Improvements in Combination Seats and Beds for Automobiles; and I do hereby declare the following to be a full, clear, and exact description of the invention, such as will enable others skilled in the art to which it appertains to make and use the same.

The present invention relates to improvements in automobile convertible seats and beds and has for an object to provide an improved foldable seat for the automobile in which the back may be lowered to a substantially horizontal position in alinement with the front and back seats in order to constitute a bed.

It is another object of the present invention to provide a convertible seat of this character which is further adapted to fold compactly out of the way when not in use to give additional room within the vehicle for the placing of baggage and the like.

With the foregoing and other objects in view, the invention will be more particularly described in connection with the accompanying drawings, wherein like reference symbols refer to like or corresponding parts throughout the several views, and in which—

Figure 1 is a longitudinal sectional view through a portion of an automobile showing the seat in the compactly folded position;

Fig. 2 shows a similar view with the back of the seat in a horizontal position in full lines and with the back elevated and in an upright position in dotted lines;

Fig. 3 is a plan view of Fig. 2 omitting the dotted line upright position of the back;

Fig. 4 is an enlarged view of the seat and back fittings;

Fig. 5 is an enlarged view of the pivotal joint between the back and seat fittings;

Fig. 6 is a plan view of one member of the joint;

Fig. 7 is a similar view of the second member of the joint;

Fig. 8 is a sectional view taken on the line 8—8 in Fig. 4;

Fig. 9 is a sectional view taken on the line 9—9 in Fig. 6, and

Fig. 10 is a similar view taken on the line 10—10 in Fig. 7.

Referring more particularly to the drawings, 1 designates generally an automobile body having a rear seat 2 and front seats 3, between which latter is preferably a space 4 made to set up a communication between the front and rear seats without requiring the occupant to leave the automobile. At 5 are represented rear doors of the automobile body.

In accordance with the present invention the seat 3 is provided with front legs 6 pivoted as indicated at 7 to brackets 8 secured to the floor of the body. By reason of these parts the seat 3 is enabled to swing forwardly until it rests in a substantially upright position as illustrated in Fig. 1, rear legs 9 are carried by the seat 3 and are rigid therewith so as to be lifted from the floor when the seat is thus raised, thereby leaving a clear and uninterrupted floor space in rear of the seat.

A back 10 is provided in conjunction with the seat 3 and is so joined with the latter as to enable the extension of these parts in a substantially horizontal manner as represented in Fig. 2 to form a bed in combination with the rear seat 2; and moreover to allow the back 10 to assume an upright position where it will be effectively held against accidental displacement to support the back of the occupant of the seat 3. The back 10 is enabled to accomplish these purposes by the construction shown more particularly in Figs. 4 to 10 inclusive in which 11 designates a fitting or bar provided with perforations 12 to receive fastenings by which the bar 11 is secured beneath the seat 3 at or near its rear edge. The bar is provided with a pair of rearwardly extending arms 13 which carry disks 14. The disks 14 are formed on their inner faces with lugs 15 having intersecting faces 16 and 17 which meet in a substantially right angle.

The disks 14 are also perforated centrally as at 18 in order to receive the pivot bolts or pins 19. Said pivot bolts or pins 19 also play loosely in elongated slots 20 made in a pair of disks 21 which are placed inwardly of the disks 14 as shown in Fig. 4. The slots 20 are reinforced at the outer faces of the disks 21 by flanges 22, most clearly shown in Figs. 7 and 10 and lugs 23 extend downwardly from the forward corners of the flanges 22 in order to coöperate with the lugs 15 on the companion disks 14 in a manner to be hereinafter described. The disks 21 carry rods 24 which are slidingly received within the tubular sockets 25 carried by a frame 26 which lies within the back 10. The frame 26 is preferably reinforced by a web 27 at its lower portion which web extends between substantially the central portions of the socket 25. The frame and web are also provided with perforations 28 to receive fastenings by which they may be secured within the back. This frame also reinforces the construction of the back and avoids the splitting of the wood or other bracing of the back.

In operation the back 10 may be folded compactly against the base of the seat 3 by rotating the seat about its pivoted pins 7 and the back about its pivots 19. This position of the parts is shown in Fig. 1 and provides a very roomy body when the front seat next the driver is not occupied.

When it is desired to make the device into a bed, the back 10 is lifted upwardly about its pivots 19 and the seat 3 is swung over rearwardly until it is allowed to rest upon its rear legs 9. The back 10 is made to extend horizontally in alinement with the rear seat 2 and the front seat 3 and the disposition and size of these various seats is such that the back 10 will completely fill the gap therebetween, it being supported with advantage at the rear by a cleat 29 secured to an appropriate part of the automobile body.

When further it is desired to utilize the device as a seat, the back 10 is lifted upwardly from the position shown in Fig. 2 about its pivots 19, and in order to permit this without interference from the upholstery of the back 10 and seat 3, said back 10 is first drawn rearwardly which is permitted by the movement of the sockets 25 on the rods 24. Of course the back 10 is raised sufficiently so as to clear the rear seat 2 before this movement is effected. The raised position of seat 3 is indicated in dotted lines in Fig. 2; here is also illustrated how the upholstery of the back 10 rests upon the rear portion of the upholstery of the seat 3.

This is desirable in order to bring the seat and back into a proper relation for comfortable occupancy. It is also necessary in order to avoid the gap that would otherwise occur between the upholstery of the seat and the back that such back 10 should be made slidable relative to the seat 3 and this is as before explained, accomplished through the telescoping of the rods 24 and sockets 25.

Now it is further necessary that when the back 10 is lifted to the position shown in dotted lines in Fig. 2 that it be held there in order to form a suitable support for the occupant of the seat 3. This I accomplish through the use of the lugs 15 and 23. It will be noted by reference to Fig. 5, that as the back 10 is raised the rounded or cam front lower edges 30 of the flanges 22 will encounter the upper faces 17 of the lugs 15 on the companion disks 14 and will tend to elevate the disks 21 together with the back 10. The elevating movement will be permitted by the presence of the slots 20 in the disks 21 which slide on the pivots 19. When the back 10 is in the full raised position, the lugs 23 may slide down behind the walls 16 of the lugs 15 and inasmuch as the weight of the back 10 and its associated parts will tend to hold the parts in this latter position, no tendency of the back 10 to become loosened or to give way will result. So soon as it is desired to lower the back 10 to provide a bed or to fold its parts away, this may be accomplished by first lifting the back together with the disk 21 in order to enable the lugs 23 to escape from the walls 16 of the lugs 15. This device serves to form a simple and effective means for locking the back in an upright position yet for freely and conveniently allowing of its being lowered whenever occasion demands.

A brace rod 31 is connected between the rods 24. This brace rod is preferably a round rod of $\frac{5}{16}$ or $\frac{3}{8}$ inch in diameter inserted in drill holes in the parts 24. By grasping this brace rod 31 and lifting the same when the back of the seat is up, the action will disengage the lock hinge so as to allow the back to be moved to the other positions desired.

I have described preferred and satisfactory constructions but desire it to be understood that various changes and modifications may be made without departing from the spirit of the invention provided such changes are within the scope of the appended claims.

What is claimed is:

1. In a vehicle, a seat, a back therefor, fixtures secured to the back and seat and being pivotally connected together to admit of the swinging of the back, one fixture being slotted to slide on the pivot with respect to the other fixture and independently of the pivotal movement, coöperating lugs on the fixtures adapted to abut together to hold the back elevated, one of the lugs having a cam face to slide over the other lug, substantially as described.

2. In a vehicle, a seat, a back therefor, fixtures disposed between the seat and back and being pivoted together, coöperating parts on the fixtures projecting toward one another and having abrupt faces adapted to abut together to hold the back in the raised position, one of said fixtures being slotted to slide on the pivot independently of the pivotal movement, one of said coöperating parts having a cam face adapted to encounter the other part whereby to automatically cause sliding of the fixture as the back is elevated, substantially as described.

3. In a vehicle, a seat, a back therefor, fixtures secured to the back and seat and having companion disks, pivots passing through the disks, one disk being slotted to slide on the pivot, a lug on one disk, and a coöperating lug on the other disk for engagement with the first lug and having a cam face to slide over said first lug, substantially as described.

4. In a vehicle, a seat, a back therefor, a frame mounted in said back and provided with tubular sockets, rods fitted in said sockets, said back and sockets being movable on said rods, connecting means between the rods, plates carried by said rods, other plates carried by the seat, pivots passing through said plates to permit the back to swing with respect to the seat, the plates carried by said rods being slotted to slide on the pivots, and coöperating parts carried by the plates on the rods and the plates on the seat adapted to interlock together to hold the back in elevated position and being movable out of interlocking relation when the slotted plates are slid to one position on said pivots, one of the coöperating parts on said plates being provided with a cam face for engaging the companion part whereby to automatically cause the parts to assume the interlocked position when the back is elevated, substantially as described.

LEVIN GRUBB TAYLOR.